Patented Feb. 7, 1928.

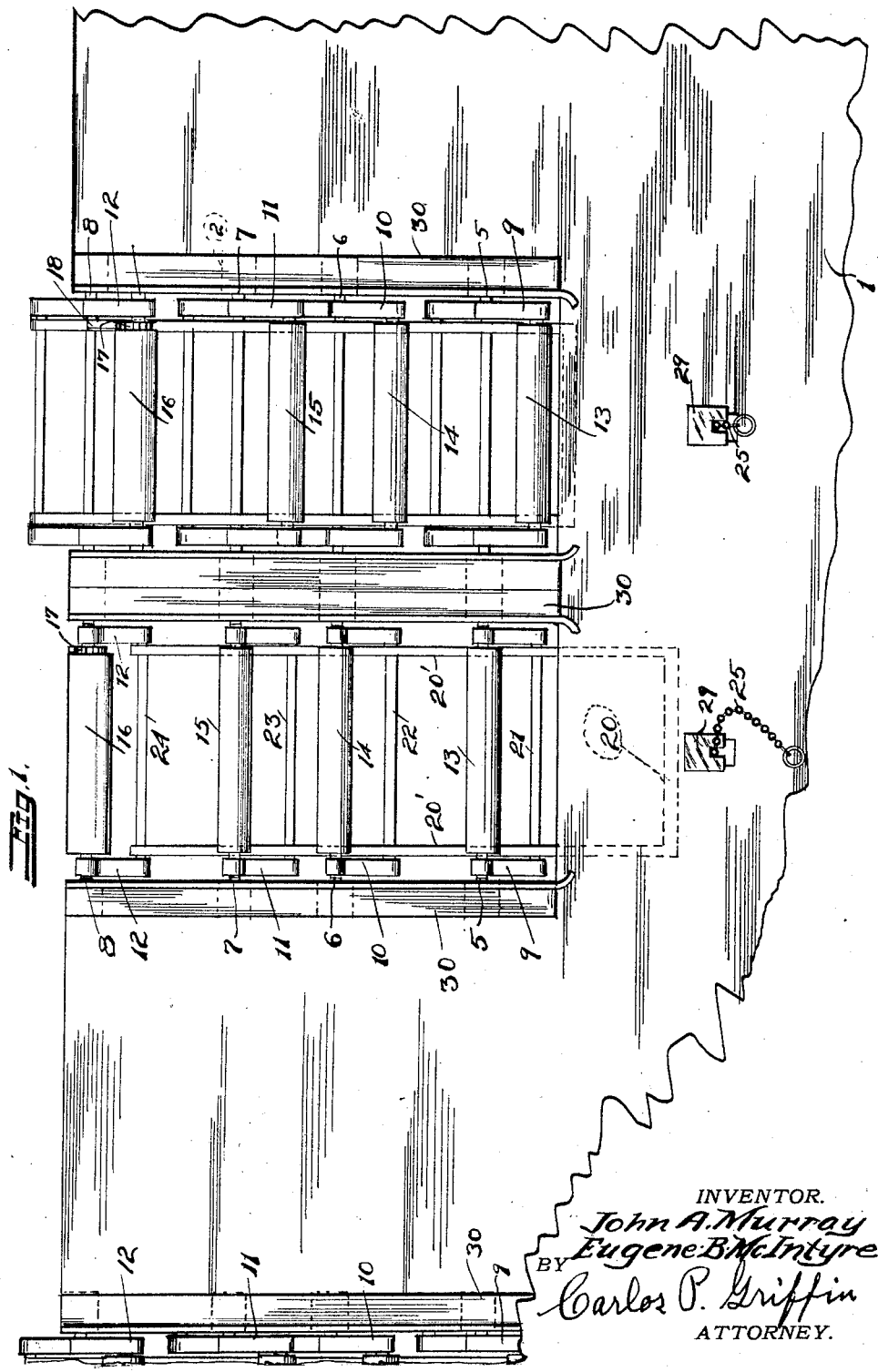

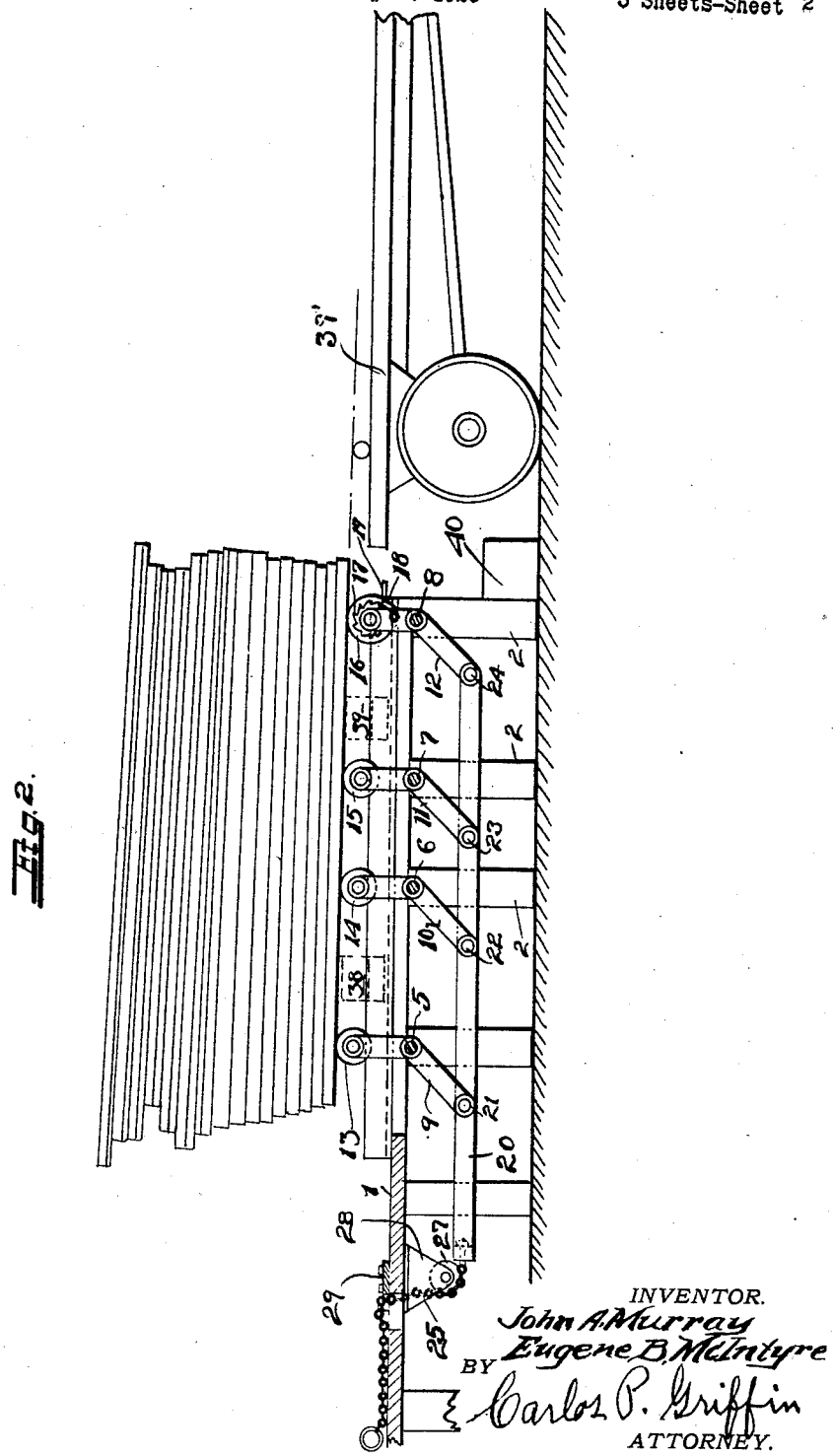

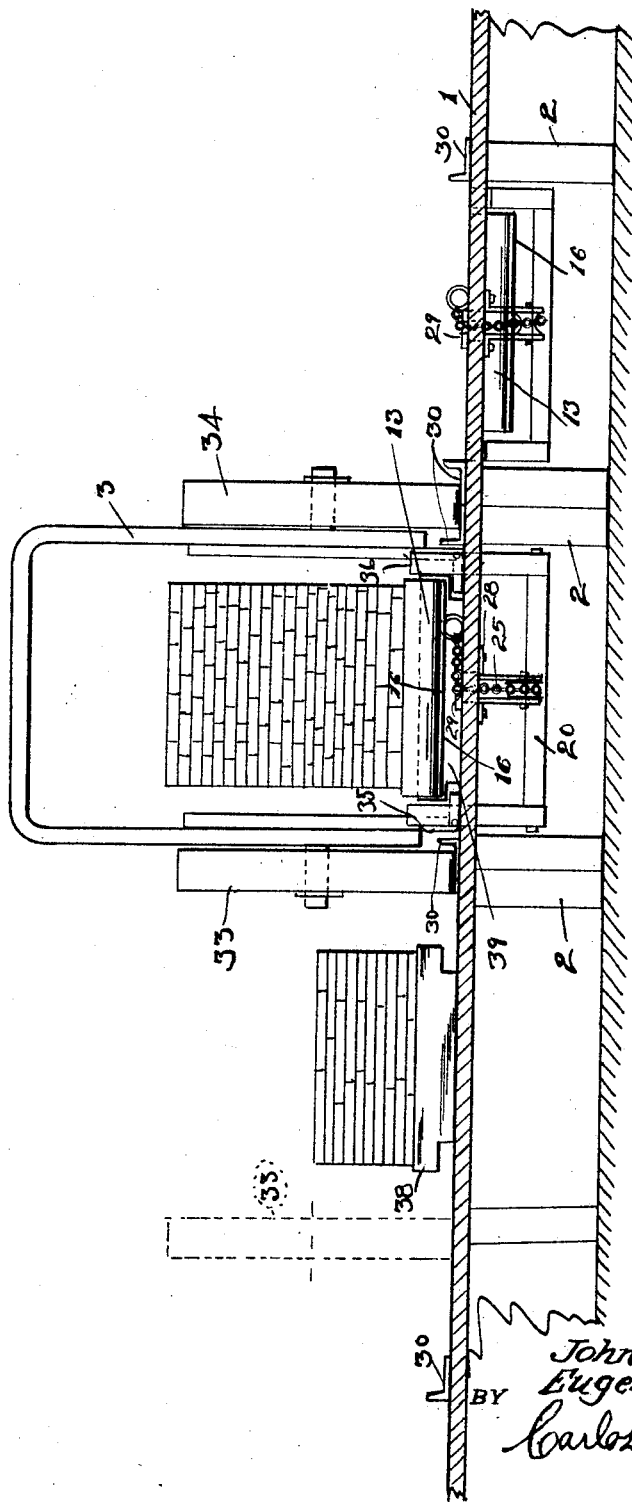

UNITED STATES PATENT OFFICE.

JOHN A. MURRAY AND EUGENE B. McINTYRE, OF SAN FRANCISCO, CALIFORNIA.

LUMBER-LOADING DOCK.

Application filed May 12, 1926. Serial No. 108,472.

This invention relates to a lumber loading dock, and its object is to provide means whereby piles of lumber may be assembled in a given place for loading on its trucks for shipment to various points at which the lumber is to be used.

It will be understood by those skilled in the art and persons operating lumber yards that orders for lumber for local delivery will include a truck load more or less of lumber of various sizes and kinds, the ordinary practice is to provide the yard with a series of two wheel trucks upon which five hundred, six hundred or one thousand feet of lumber is placed and then the lumber placed upon several of these different trucks is re-assembled upon a series of horses from which horses it is transferred to the city truck for delivery on the job, a given load of lumber often having four or five different kinds of material assembled from as many different places in the yard. Inasmuch as the horses or tressels are movable and more or less insecure, it is not possible to provide them with rollers for rolling the load onto the rollers of the city truck or delivery truck, so that accidents frequently happen in transferring the load from the tressels to the truck.

In the present case, a series of loading platforms are used, each loading platform having a series of roller supports upon which a load of lumber may be assembled by a lumber carrier which lumber carrier forms no part of the present invention, and from which roller platform the load is transferred to the delivery truck in a very few minutes by simply releasing a lock on one of the rollers.

Another object of this invention is to reduce the number of handlings of the lumber.

From what has been said, it will be apparent that if the delivery truck is to have an entire load made up of one kind of lumber, that the lumber carrier could place that load in position on the platform to be transferred to the delivery truck, without repiling again, at least the lumber carrier can place as much on the roller platform as the first part of the load which happens to be of the same kind of material.

Another object of the invention is to provide an apparatus of the class described in which space between each roller platform and the next roller platform will be provided for placing the top portion of the delivery truck load which is then transferred to the foundation portion manually or otherwise.

Another object of the invention is to provide a platform of the character described in which two roller platforms will be set up adjacent each other, while between the next pair will be space for the lumber carrier to drive in and leave its load.

Another object of the invention is to provide means whereby the lumber supporting rollers may be raised to receive the load when the lumber carrier brings the load to the loading dock or platform.

Another object of the invention is to lock the lumber rolls so that the lumber cannot be accidentally discharged from the rolls said rolls being placed on a slight incline to make the lumber roll on to the truck easily when desired.

Operations carried out with this lumber loading system makes a saving of from seventy-five cents to one dollar per thousand board feet in handling the lumber from a large commercial yard to the city delivery trucks.

Other objects of the invention will appear as the description proceeds.

An embodiment of the invention is shown in the accompanying drawings in which the same reference numeral is applied to the same portion throughout, but we are aware that there may be modifications thereof.

Figure 1 is a plan view of a portion of the loading platform showing two of the roller platforms, and a portion of another, Figure 2 is a side elevation of one of the roller platforms showing the means for raising the lumber supporting rollers to receive the load, and illustrating the position occupied by one of the delivery trucks when about to receive the load, the load on the rollers being made up in this instance of two different kinds of material, Figure 3 is a sectional view of the main platform showing the lumber carrier discharging substantially a full load of one kind of lumber upon the supporting rollers, while a small portion of a different kind of lumber has been discharged at the side of the roller dock preparatory to being placed upon the load upon the rollers.

The numeral 1 represents a suitable platform supported on posts 2 in sufficient number as may be necessary to provide a substantial support for the lumber carrier 3 to drive on. A suitable incline from the ground level is provided at one point for the lumber carrier to drive up on the platform 1, but which incline forms no part of the present invention therefore is not illustrated. Ordinarily the platform may be several hundred feet long and may have a dozen or more sets of rollers thereon.

At the edge of the platform there are open spaces in each of which are mounted four fixed shafts 5 to 8 inclusive, and on these shafts are mounted eight heavy bell crank arms 9 to 12 inclusive, two on each shaft. The upper ends of the bell crank arms have journals to support the horizontal rollers 13 to 16 inclusive, the latter of which is somewhat larger and heavier than the other three since it must support substantially all of the load during a portion of the time it is being transferred to the delivery truck. The roller 16 is provided with a pawl wheel 17 at one end, and with a pawl 18 pivotally connected on the bell crank 12. An arm 19 on the pawl enables it to be disengaged from the pawl wheel 17 when it is desired to transfer the load of lumber to the delivery truck.

Below the platform 1 there is a heavy yoke 20, its members 20′ being connected to the lower ends of the bell cranks 5 to 8 inclusive by means of rods 21—22 to 24 inclusive. The yoke has a chain 25 connected thereto at one end, said chain passing around a grooved pulley 27 pivotally carried by a depending bracket 28. On the top of the platform there is a notched plate 29, and the chain can be pulled up or dropped through the hole in the platform and stopped by engaging it with the notched plate 29.

Each set of rollers is substantially the same in construction and operation as each other set, so it will be unnecessary to describe more than one, other than to say that at the sides of the openings extending along the ends of the rollers there is a heavy angle plate 30 to prevent the lumber carrier from running off the platform into the hole between the rollers. Two sets of rollers are assembled close enough to each other so that only the wheels of the lumber carrier can pass between them, while the next two adjacent sets are far enough from each other to enable the lumber carrier to drive on that platform with a full load of lumber, and not interfere with the action of the lumber carrier with respect to either of the sets of rollers when a foundation load is to be placed directly upon the rollers.

The lumber carrier 3 is merely diagrammatically illustrated, and forms no part of the present invention. It has the supporting wheels 33—34 and suitable means 35—36 at each side to pick up the loaded lumber bunks 38—39 of which two are ordinarily used to carry a load.

The delivery truck is illustrated at 39′ and the platform is provided with a heavy bumper at 40 to prevent the delivery truck from backing into the lumber platform and injuring the same.

The operation of the apparatus is as follows: An order will be given for a load of lumber possibly made up of three or four different kinds of lumber, the workman in the yard will first place the foundation load for the delivery truck on a pair of the bunks whereupon the lumber carrier will go to that point, pick up the load and carry it over the rollers when they are in the down position, as illustrated at the right of the lumber carrier in Figure 3 and then a workman will pull on the chain and hook it into the plate 29. This will bring the rollers up close to the load of lumber supported by the carrier, thereupon the carrier man will lower the load of lumber until it is supported by the rollers 13 to 16 and the bunks will then be removed from the load entirely. As soon as the bunks are removed, the lumber carrier is free to go elsewhere to pick up another load or part of a load. If the load the lumber carrier has placed upon the rollers is all that the delivery truck is intended to take, nothing further is needed, but if the load is only a portion of a load the lumber carrier will bring up the load and deposit it on the platform, as shown at the left hand side of the lumber carrier in Figure 3. This portion of the load will then be piled by hand or otherwise, on the load already placed on the rollers, and as soon as the pile is complete the delivery truck man will roll the same off the rollers onto the delivery truck.

It will thus be seen that there may be a half dozen or a dozen loads in process of formation all the time on the supporting rollers, and that whenever a load is complete it may be immediately loaded onto one of the delivery trucks, the rollers being lowered to allow the lumber carrier to bring on a fresh foundation load.

It will be noted that in Figure 3 the lumber carrier has brought on to the rollers a substantially complete load, while in Figure 2 the load is made up of two different kinds of lumber, a portion of a load also having been brought into the intermediate platform in Figure 3.

Having thus described our invention, what we desire to secure by Letters Patent of the United States is as follows, but modifications may be made in carrying out the invention as shown in the drawings and in the above particularly described form thereof, within the purview of the annexed claims:

1. A lumber platform comprising an elevated platform, a series of rollers spaced apart transversely of said platform, said rollers having a pitch upward from front to back, the front roller having a larger diameter than the others, means on said front roller to prevent its turning at will, and means to raise or lower all of said rollers simultaneously.

2. A lumber loading platform comprising a plurality of movable rollers having a pitch upward from front to back, means to lock the front roller from turning, said front roller having a larger diameter than the others, means to raise or lower all of said rollers simultaneously, and means to hold said rollers in the raised position to receive a load of lumber thereon.

3. A lumber loading platform comprising an elevated platform, a plurality of movable transverse rollers thereon, said rollers having an upward pitch from front to back, the front roller having the largest diameter of the series, means to raise all of said rollers simultaneously to enable them to receive a load of lumber to be discharged upon a delivery truck, means to lock the rollers in an elevated position, and means to lock said front roller from turning.

4. A lumber loading platform comprising a series of load supporting rollers, means to raise or lower said rollers, means to lock the front one of said rollers, said front rollers being larger in diameter than the other rollers, said series of rollers having a pitch upward from front to back.

5. A lumber loading platform comprising an elevated platform, several sets of horizontal roller supports, each of which is to receive a load of lumber, said sets being spaced apart from each other on one side far enough to enable the wheel of a lumber carrier to pass between them, and far enough apart on the other side to permit the lumber carrier to drive between them to deposit a load upon a platform at substantially the elevation of the roller platform.

6. A lumber loading platform comprising an elevated platform, a series of sets of horizontal rollers thereon placed at an incline, means to lock one of said rollers, means to release it whereby the load of lumber thereon may be transferred to a delivery truck, and means to raise and lower said rollers simultaneously.

In testimony whereof we have hereunto set our hands.

JOHN A. MURRAY.
EUGENE B. McINTYRE.